United States Patent
Liao et al.

(10) Patent No.: US 7,308,002 B2
(45) Date of Patent: Dec. 11, 2007

(54) PACKET TYPE ARBITRATOR IN WLAN AND CORRESPONDING ARBITRATING METHOD

(75) Inventors: Yen-Chin Liao, Hsinchu (TW); Kuang-Ping Ma, Hsinchu (TW); Chia-Yung Chiu, Hsinchu (TW); Eric Huang, Hsinchu (TW); Albert Chen, Hsinchu (TW)

(73) Assignee: Intergrated System Solution Corp., Hsinchu (TW)

( * ) Notice: Subject to any disclaimer, the term of this patent is extended or adjusted under 35 U.S.C. 154(b) by 940 days.

(21) Appl. No.: 10/718,624

(22) Filed: Nov. 24, 2003

(65) Prior Publication Data

US 2005/0111436 A1    May 26, 2005

(51) Int. Cl.
*H04J 3/24* (2006.01)
(52) U.S. Cl. ...................................... 370/473; 370/249
(58) Field of Classification Search ................. 370/473
See application file for complete search history.

(56) References Cited

U.S. PATENT DOCUMENTS

| 4,970,717 | A | * | 11/1990 | Haas | 370/249 |
| 5,566,180 | A | * | 10/1996 | Eidson et al. | 370/473 |
| 5,646,959 | A | * | 7/1997 | Kamishima | 375/240 |
| 6,360,335 | B1 | * | 3/2002 | Dawson | 714/39 |
| 7,177,952 | B1 | * | 2/2007 | Wurch et al. | 709/250 |

* cited by examiner

*Primary Examiner*—Creighton Smith
(74) *Attorney, Agent, or Firm*—Birch, Stewart, Kolasch & Birch, LLP

(57) ABSTRACT

This specification discloses a packet type arbitrator in a wireless local area network (WLAN) and its arbitrating method. The arbitrator contains at least two packet type detectors and a packet type decider. The packet type detector is installed with a false alarm checking module and a timer according to the strength of the packet for delaying the decision from the packet type decider. Through the checking mechanism of the false alarm checking module and the timer, erroneous decision can be avoided when determining the packet type.

12 Claims, 6 Drawing Sheets

PACKET TYPE ARBITRATOR IN WLAN AND CORRESPONDING ARBITRATING METHOD

BACKGROUND OF THE INVENTION

1. Field of Invention

The invention relates to a packet type arbitrator and its arbitrating method. More particularly, the invention pertains to an arbitrator that determines packet types in a wireless local area network (WLAN) and the method thereof.

2. Related Art

In network systems, such as a wireless local area network (WLAN) system, data transmissions are done in packets. Different types of packets have different packet types. This is determined by the agreed protocol.

Generally speaking, a network system follows a single network protocol. One single packet type is enough to complete the communication tasks. However, based upon some particular reasons, such as concerns about compatibility, packet of many different types can exist in the same network system. Therefore, data to be transmitted from the sending end may exist in the form of any packet type. The receiving end without any assistant information has to automatically determine the received packet type and thus to decode the data in a corresponding way.

For example, two packet types simultaneously exist in the IEEE802.11 g WLAN system: the complementary code keying (CCK) packet and the orthogonal frequency division multiplexing (OFDM) packet. In such network systems, the receiver does not know the packet type of each packet to be received. It has to decide which type the packet has according to the information embedded in the preamble of the packet. When making decisions about the packet type, erroneous decisions sometimes occur due to noises. Thus, how to prevent incorrect decisions is an important issue to be solved in the field.

SUMMARY OF THE INVENTION

In view of the foregoing, the invention provides a packet type arbitrator and the corresponding arbitrating method for effectively reducing the packet type misjudge rate in a network system with different packet types.

To achieve the above objective, the invention provides a packet type arbitrator for WLAN systems. The arbitrator contains at least: two packet type detectors for detecting the received packets; and a packet type decider for claiming the type of the received packet. The packet type detector is installed with a false alarm checking module and a timer according to the strength of the packet for delaying the decision from the packet type decider. Through the checking mechanism of the false alarm checking module and the timer, erroneous decision can be avoided when determining the packet type.

The invention further provides a packet type arbitrating method. The method includes the following steps. First, one has to define that a first packet type has a larger strength and a second packet type has a smaller strength. A false alarm checking mechanism is installed in a first packet type detector. A timer is installed in a second packet type detector. When the first packet type detector detects a received packet, a false alarm checking procedure is triggered. When the second packet type detector receives the packet, the timer is started. When each packet detector receives the first packet type or the second packet type, a packet type decider determines the type of the received packet after the timer and the false alarm checking module complete checking.

Through the detection of packet type detectors along with the timer and the false alarm checking mechanism, the invention can effectively reduce the packet type misjudge rate.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
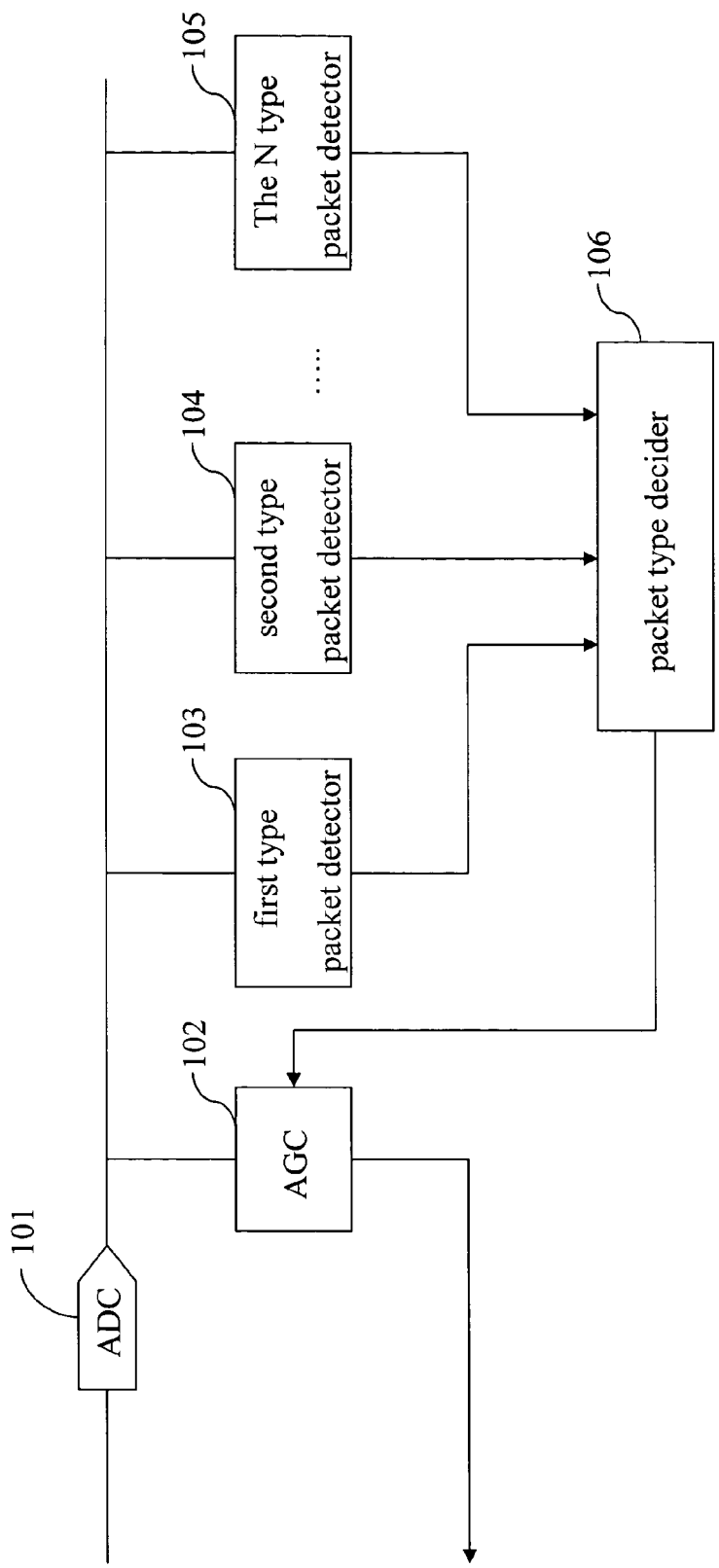
FIG. 1 shows an embodiment of the disclosed packet type arbitrator.

As shown in FIG. 1, after the receiver receives an analog signal, an analog-digital converter (ADC) 101 converts it into a digital signal. The digital signal is sent to an automatic gain control (AGC) 102 to compute the difference between the digital signal level and a target level. The difference is then converted into a gain, which is sent to a variable gain amplifier (VGA) to adjust the level of the subsequent signals. The digital signal is simultaneously sent to several packet type detectors 103, 104, 105 for packet type detection. Each packet type detector assumes the received signal has the corresponding packet type. After computing a delay correlation value or any other value that helps determining the existence of a packet, the value is compared with a threshold. If the value is greater than the threshold, the received packet is determined to have the corresponding packet type.

Figure 2:
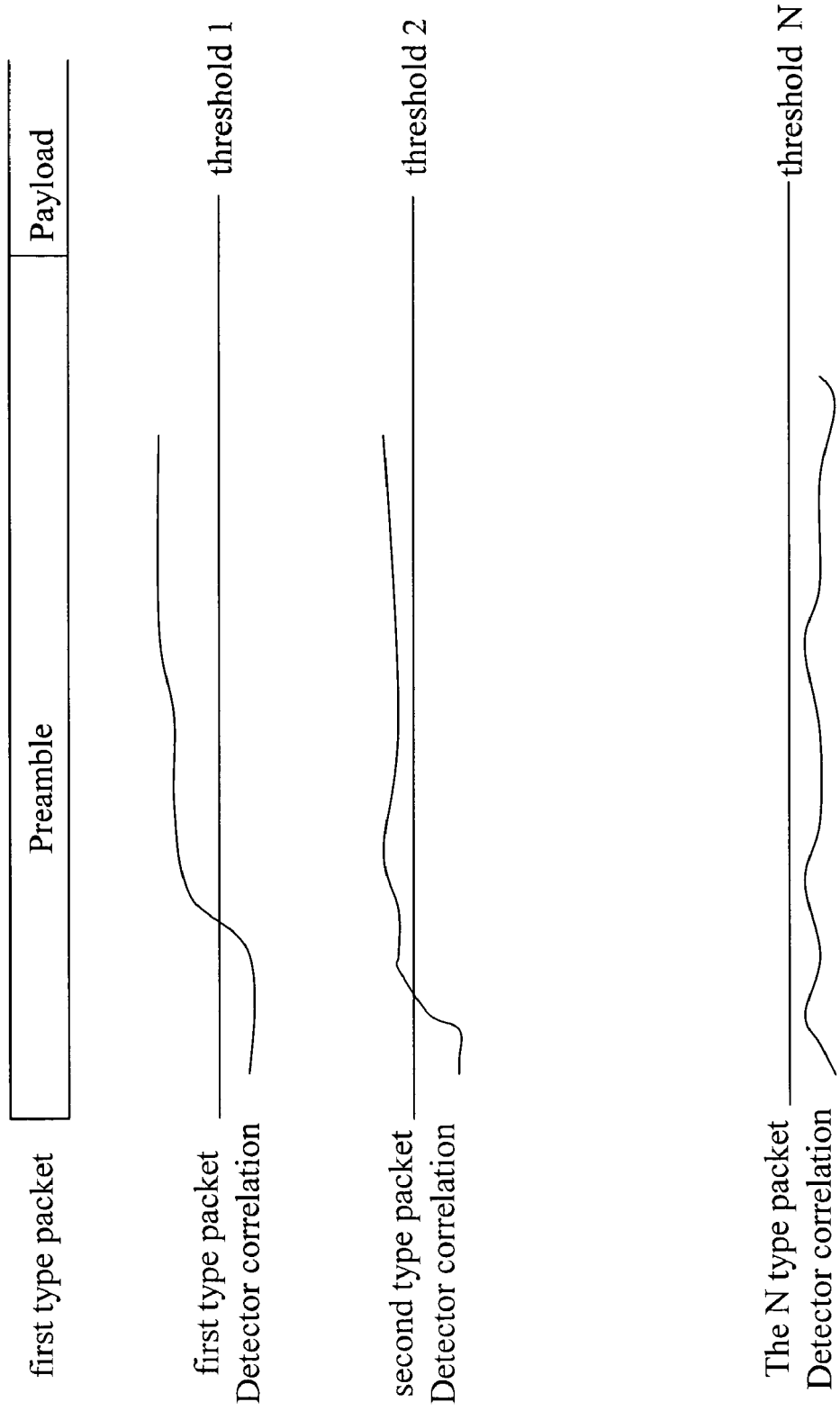
FIG. 2 is a schematic view of possible erroneous decisions.

Ideally, if the threshold for each packet is properly chosen, only the packet type detector with the correct packet type can detect the existence of the packet. However, there are noises in reality that makes the selection of an appropriate threshold difficult. The result is that there might be more than one packet type detector claiming the existence of the packet. As shown in FIG. 2, if the transmitted packet is a first type packet, both the first type packet detector 103 and the second type packet detector 104 detect the packet. The second type packet detector 104 may detect the packet at an earlier time than the first type packet detector 103. Therefore, one must take into account such mistakes.

All the embodiments in the specification assume the first packet type has a larger strength while the second packet type a smaller strength. The packet in a format with a smaller strength is easier to detect. The packet type detectors 103, 104 are installed with a false alarm checking module and a timer according to the strength of the packet to delay the decision made by the packet type decider 106. The false alarm checking module uses a delay correlation value or any other value that helps determine the existence of a packet. The value is compared with a threshold. If it is greater than the threshold, the packet type detector determines the received packet has the corresponding packet type of the packet type detector 103. The selection of the threshold is statistically generated using a simulation, experiment or some other method. The timer checking has a time parameter, also statistically generated using a simulation, experiment or some other method. The time parameter is used to check whether the verification is done. Through the checking mechanism of the false alarm checking module and the timer, wrong decision about the packet type can be avoided. The first packet type detector 103 of the packet type arbitrator in all embodiments of the invention has the false alarm checking module for delaying the decision of the decider. The packet type decider 106 does not decide the type of the received packet until the false alarm checking is passed. The second packet type detector 104 of the packet type arbitrator in all embodiments of the invention has the timer for delaying the decision of the decider. The packet type decider 106 does not decide the type of the received packet until both the false alarm checking and the timer checking are passed.

In the following, we use different types of transmitted packets and different packet type detectors 103, 104 to explain how the invention works. It should be emphasized that the embodiments here should not be used to limit the scope of the invention. The invention also applies to other types of packets and packet type detectors.

Figure 3:
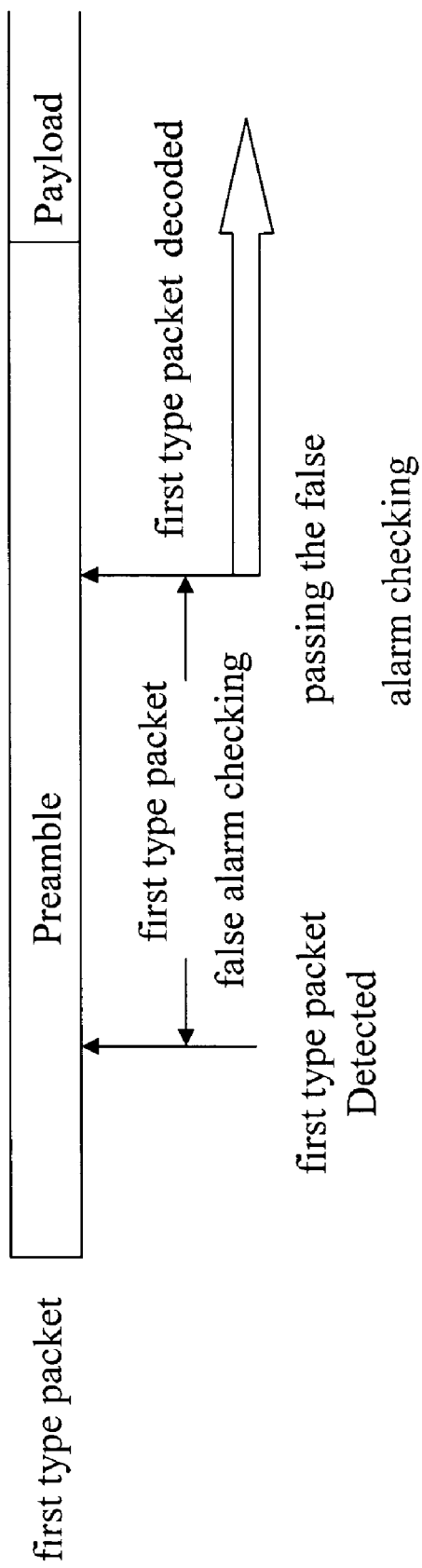
FIG. 3 is a schematic view of the arbitrating process in the first embodiment.

As shown in FIG. 3, if a first type packet is being transmitted, the first packet type detector 103 can detects the existence of the packet while the second packet type detector 104 cannot. The packet type decider 106 does not immediately claim the received packet has the first packet type. The first packet type detector 103 performs the false alarm checking to compute another more reliable number to justify the existence of the packet. Once passing the false alarm checking, the packet type decider 106 determines the received packet as a first type packet. The packet is then decoded according to the method for the first packet type.

Figure 4:
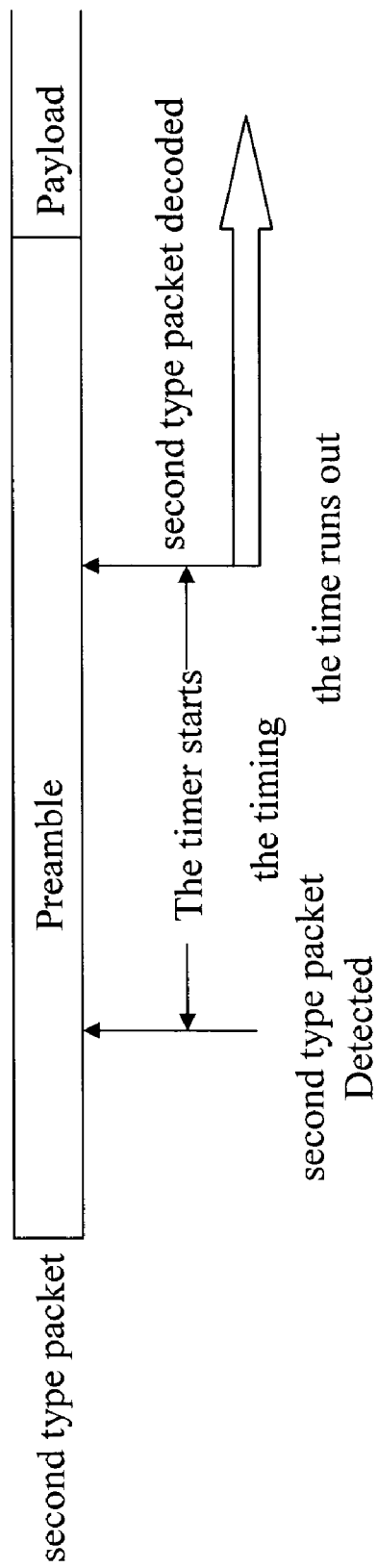
FIG. 4 is a schematic view of the arbitrating process in the second embodiment.

As shown in FIG. 4, if a second type packet is being transmitted, the second packet type detector 104 detects its existence while the first packet type detector 103 does not. Likewise, the packet type decider 106 does not immediately claim the received packet has the second packet type. The timer starts the timing. If no other packet type detector detects the existence of the packet before the time runs out, the packet type decider 106 determines the received packet as a second type packet. The packet is then decoded according to the method for the second packet type.

Figure 5:
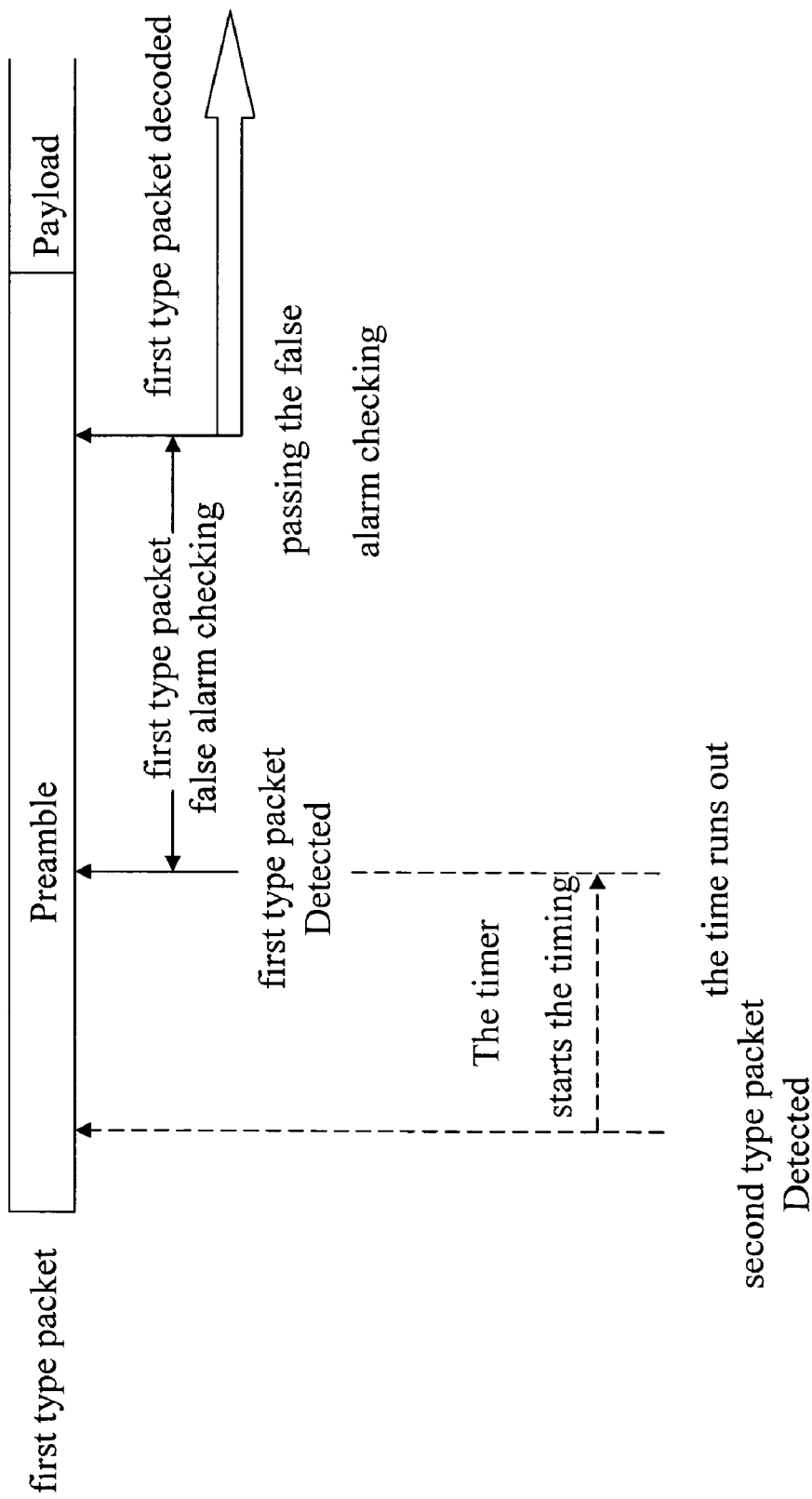
FIG. 5 is a schematic view of the arbitrating process in the third embodiment.

FIG. 5 shows that a first type packet is being transmitted and the second packet type detector 104 detects its existence earlier than the first packet type detector 103. In this case, the timer also starts timing. During the timing process, the first packet type detector 103 also detects the existence of the packet. The first packet type detector performs the false alarm checking and stops the timer in the second packet type detector 104. Once passing the false alarm checking, the packet type decider 106 determines the received packet as a first type packet. The packet is then decoded according to the method for the first packet type.

Figure 6:
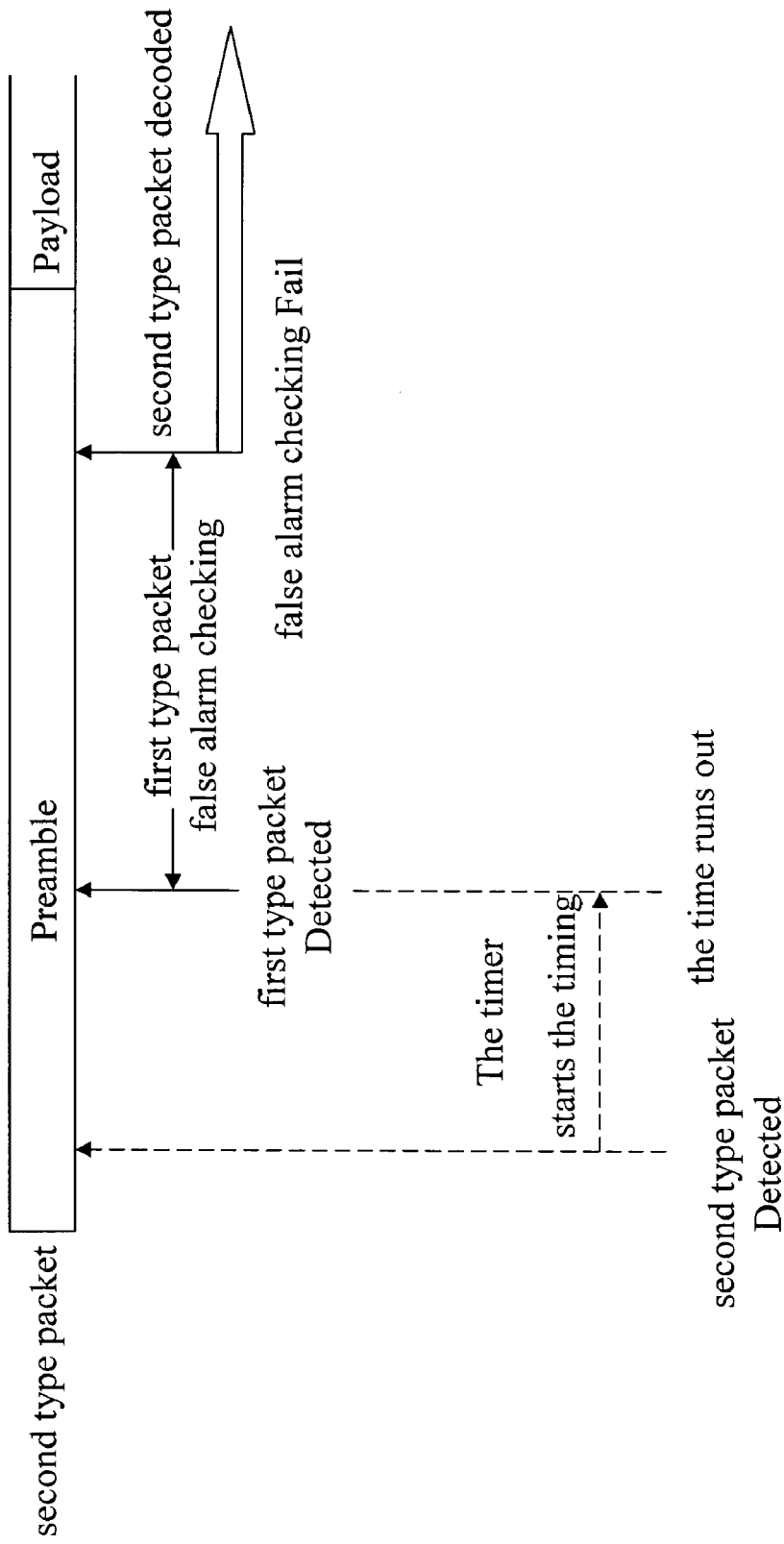
FIG. 6 is a schematic view of the arbitrating process in the fourth embodiment.

FIG. 6 shows that a second type packet is being transmitted and the second packet type detector 104 detects its existence earlier than the first packet type detector 103. In this case, the timer also starts timing. During the timing process, the first packet type detector 103 also detects the existence of the packet. The first packet type detector performs the false alarm checking and stops the timer in the second packet type detector 104. When the false alarm checking fails, the packet type decider 106 determines the received packet as a second type packet. The packet is then decoded according to the method for the second packet type. With the checking by the timer and the false alarm checking module, the probability of packet type misjudges can be effectively lowered.

Certain variations would be apparent to those skilled in the art, which variations are considered within the spirit and scope of the claimed invention.

What is claimed is:

1. A packet type arbitrator for a wireless local area network (WLAN), which comprises:
   a first packet type detector, which detects a received packet and includes a false alarm checking module;
   a second packet type detector, which detects the received packet and includes a timer; and
   a packet type decider, which couples to the first packet type detector and the second packet type detector for determining the type of the received packet;
   wherein after each of the packet type detectors gets the received packet and the timer and/or the false alarm checking module checks the packet, the packet type decider determines the type of the packet being received.

2. The packet type arbitrator of claim 1, wherein the false alarm checking module uses a delay correlation value or any other value that helps determine the existence of a packet and compares it with a threshold so that when the packet type detector identifies the received packet is of the type corresponding to the packet type detector if the value is greater than the threshold.

3. The packet type arbitrator of claim 1, wherein the timer uses a time parameter to check whether the checking is done within the time specified by the time parameter.

4. The packet type arbitrator of claim 1, wherein the first packet type has a larger strength while the second packet type has a smaller strength.

5. The packet type arbitrator of claim 4, wherein any packet with a smaller strength is detected earlier than any packet with a larger strength.

6. A packet type arbitrating method for a wireless local area network (WLAN), which comprises the steps of:
   associating a first packet type with a larger strength and a second packet type with a smaller strength;

installing a false alarm checking mechanism in a first packet type detector;

installing a timer in a second packet type detector;

starting a false alarm checking when the first packet type detector receives a packet;

starting a timer checking when the second packet type detector receives a packet; and using a packet type decider determines the type of the packet being received after each of the packet type detectors receives a packet and the false alarm checking or the timer checks the packet.

7. The method of claim 6, wherein the any packet with a smaller strength is detected earlier than any packet with a larger strength.

8. The method of claim 6, wherein when both the first packet type detector and the second packet type detector detect the received packet the type of the received packet is determined by whether the false alarm checking passes through.

9. The method of claim 6, wherein the packet type decider determines the received packet is of the first packet type if the false alarm checking passes.

10. The method of claim 6, wherein the packet type decider determines the received packet is of the second packet type if the false alarm checking fails.

11. The method of claim 6, wherein the false alarm checking module uses a delay correlation value or any other value that helps determine the existence of a packet and compares it with a threshold so that when the packet type detector identifies the received packet is of the type corresponding to the packet type detector if the value is greater than the threshold.

12. The method of claim 6, wherein the timer uses a time parameter to check whether the checking is done within the time specified by the time parameter.

\* \* \* \* \*